C. BUTTERS.
APPARATUS FOR FILTERING SLIMES.
APPLICATION FILED OCT. 18, 1913.
1,100,222.
Patented June 16, 1914.
3 SHEETS—SHEET 2.
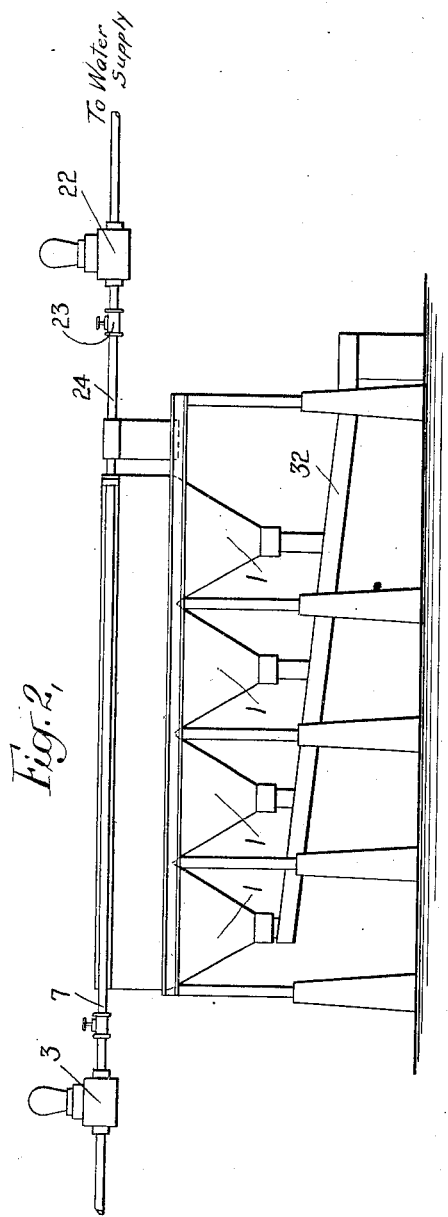
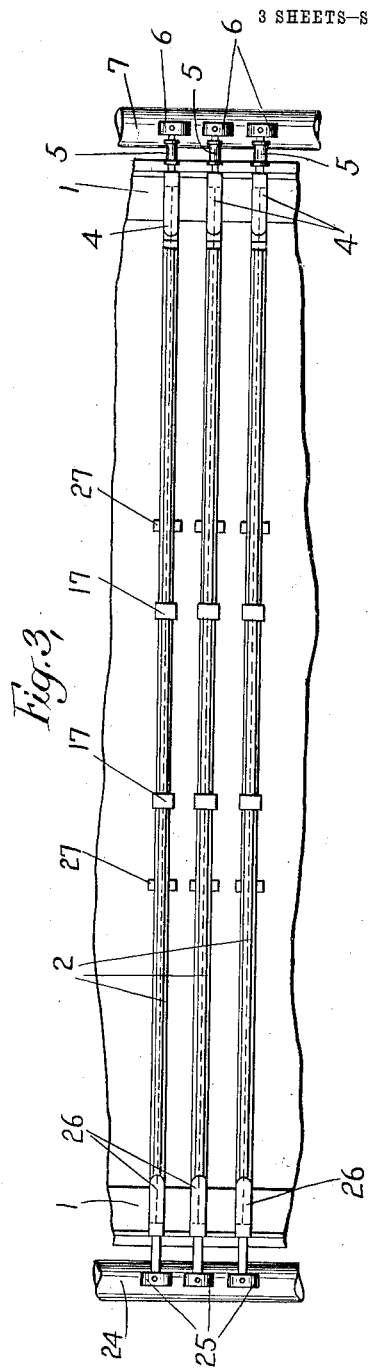

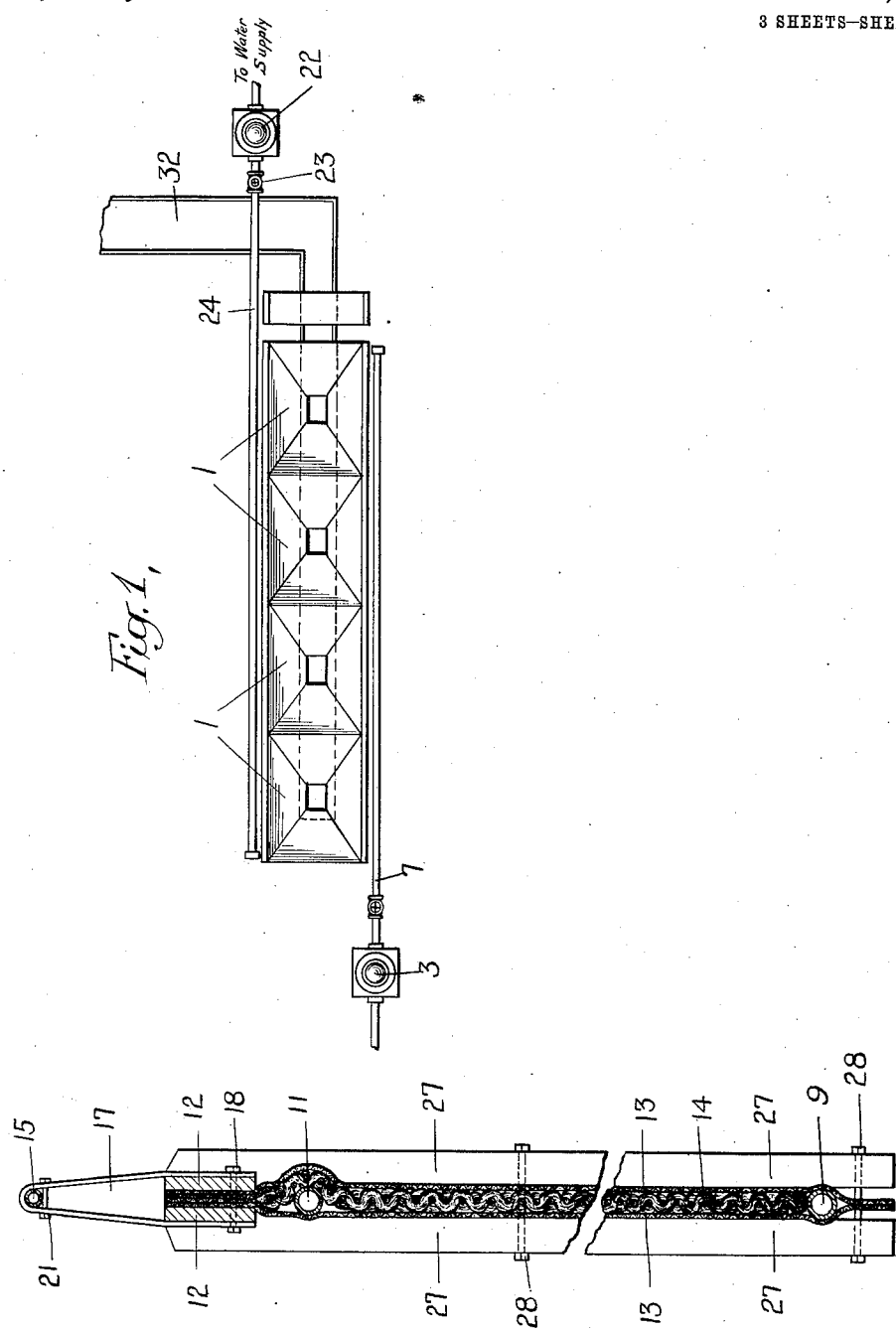

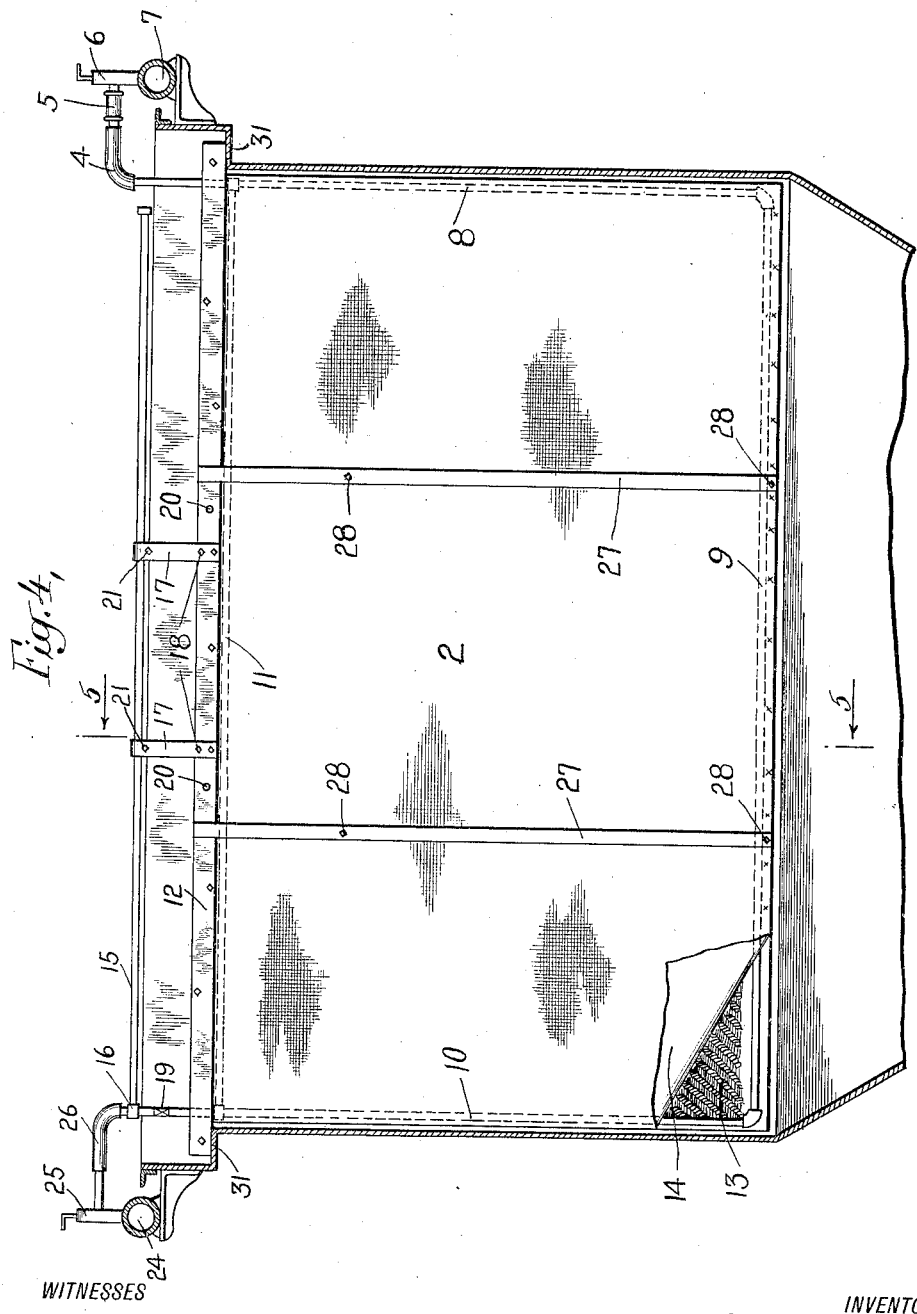

UNITED STATES PATENT OFFICE.

CHARLES BUTTERS, OF OAKLAND, CALIFORNIA.

APPARATUS FOR FILTERING SLIMES.

1,100,222. Specification of Letters Patent. Patented June 16, 1914.

Original application filed June 13, 1913, Serial No. 773,375. Divided and this application filed October 18, 1913. Serial No. 795,869.

*To all whom it may concern:*

Be it known that I, CHARLES BUTTERS, a citizen of the United States, and a resident of Oakland, county of Alameda, State of California, have invented new and useful Improvements in Apparatus for Filtering Slimes, of which the following is a specification.

An object of my invention is the production of a filter leaf of low cost and simple construction which will permit of economical filtering and satisfactory cake dislodgment.

In abstracting the values from slimes one of the most difficult and troublesome problems is to dislodge reliably and within an economical time, the slime cake from the surface of the filtering medium after the filtering process has been completed, without injuring the filter surface of the leaf.

It has been the practice heretofore to dislodge slime cakes by air pressure placed on the interior of the leaves while suspended in the air, or this has been accomplished in some cases by water under pressure being passed through the filter medium in a direction reverse to that of the filtrate. It has been supposed heretofore that to dislodge the cake reliably and within an economical time, pressure was necessary whether air, water, or other fluid was used in the dislodging step, and whether used interiorly or exteriorly. When used interiorly special precaution has sometimes been taken to get a uniformly thick, cohesive and resistant cake deposit such that the fluid under pressure might dislodge it as an entirety and make it unnecessary to use additional means to dislodge the cake completely. By my process such uniformity of the cake is of no importance at all to the cake dislodgment, and consequently the filtering operation may be more economical.

If notable internal pressure is put on a leaf for cake-dislodgment purposes, a heavy filter medium is necessary and means must be provided to prevent distention or ballooning of the filter medium. Various means have been devised to this end, all of which have added to the difficulty of cake-dislodgment. As a matter of practice, too, it is found that all such means are a hindrance to proper and economical operation; further, they shorten the life of the leaves, but they have been regarded as indispensable when former practicable methods of cake-dislodgment by internal pressure have been used.

The efficiency of the leaves heretofore used is low, first, because a considerable amount of the filter surface of the medium is obstructed by the means used to prevent ballooning, such as strips down the sides; and second, because of stitching the media together or by bolting strips onto the outside of the leaf to prevent ballooning, comparatively large holes are made in the media. Also, these holes make the media more liable to rupture under internal pressure, thus shortening their life. A further cause of low efficiency in some types of leaves has been the filler for keeping the filter media separated when suction is applied to the leaf. The types referred to are those using a rigid non-porous filler with relatively large surfaces contacting tightly with the media. These tightly contacting internal surfaces are a great hindrance to the flow of the filtrate and to the dislodgment of the cake. I therefore use a porous fibrous filler such as cocoa mat. It has also been proposed heretofore to dislodge cakes by external sprays or jets variously applied, but these have generally sought to direct the water under pressure against the cake, and rely upon the mechanical action of the water. I have discovered that pressure is unnecessary when external water is used for dislodging the cake if the cake has been previously partially dried.

It is found in practice that slime cakes have unusual adhesion and cohesion and that when a cake is formed on each side of a filter leaf they are not easily dislodged. The adhesion of the cakes depends in a measure upon the moisture contained in them, and it depends in a measure also upon the character of the filter leaf surface. I have discovered that from a comparatively smooth filter leaf surface the cake can be reliably and promptly dislodged if it is first partially dried, and is then copiously flooded externally.

By my process in its preferred form, the moisture of the cake is withdrawn as completely and rapidly as possible by maintaining the maximum possible vacuum within the leaf for a time while the leaf with the cake thereon is suspended in air. After the cake is thus "dried" water is flooded down onto the cake while the vacuum is at the same time relieved, and the cake is thereby dislodged from the filter surface in from one to three minutes and the filter surface is washed clean by the water from above. I have, therefore, devised a leaf which is simple in construction which has a perfectly smooth surface, except for one or two spacers on each side which help to hold the cakes on the leaves prior to the dislodging step; a comparatively light filter cloth; and which has means for supplying a large amount of water in a short time to the top of the cake when desired.

Other advantages will be apparent after reading the following detailed description, taken in connection with the accompanying drawings, which form a part of this specification, and in which—

Figure 1 is a plan view of the vats for containing the leaves and the vacuum and water supply pumps with their pipe connections; Fig. 2 is an elevation of the devices shown in Fig. 1; Fig. 3 is a plan view of a vat with several leaves therein; Fig. 4 is a side elevation of a leaf embodying my invention; and Fig. 5 is a section on line 5—5 of Fig. 4.

In Fig. 1 are shown vats 1 in which the slimes bath to be treated is contained and in which the leaves 2 are placed, as shown in Fig. 3. The contents of the vats may be discharged into the runway 32 by any suitable means.

The leaf shown in Fig. 4 consists of headers 12 (which support the leaf on shoulders 31 of the vats), a fibrous filler 13, preferably of cocoa mat, and a filter medium 14, such as canvas, mounted on each side of a frame and the cocoa mat. The medium may be composed of two separate pieces sewed along the sides and clamped at the top between the headers 12, or it may be a single piece sewed on the sides, clamped at the top between the headers and open across the bottom. The open portions extend a short distance below the frame member 15, say six or eight inches. The extended open portion of the medium 14 may be stitched every nine or ten inches as shown. These stitches hold the extended portions of the medium in place particularly when the leaf is being placed in the slimes either by lowering the leaf in the slimes or running the slimes into the vat around the leaf. The open portions will be closed when vacuum is turned on the leaf.

The type of leaf shown is preferred, although other types may be used. It is found in practice that by the use of a leaf of the particular type shown, the cake is more easily dislodged and there is less trouble from lime deposit.

The connections 4 communicate with the interior of the leaves through the frame members 8, 9 and 11. The lower frame member 9 is perforated or slotted along its upper side in the well known manner. The upper frame member 11 is perforated or slotted along its lower side. When the vacuum pump is started suction is produced inside the leaf through both the upper member 11 and the lower member 9. A vacuum pump 3 is connected with the interior of the leaves through the pipe 7, valves 6, sight glasses 5, connections 4 and members 8 and perforated members 9 and 11. The frame members 8, 9, 10 and 11 are connected together so as to form a rigid frame structure and are all in open communication with one another. The member 10 extends upward through the headers 12 to a T joint 16. Placed in this extension above the header is a plug 19 to seal the vacuum there and also to prevent the entrance of water from the pipe 26 into the leaf. The headers 12, which are steel members, are bent so as to allow the pipe 10 to pass between them. In order that the leaves may be properly and easily put in position in the vat, strips or spacers 27 are put on the sides of the leaf and are held in place by passing bolts 28 through them. These spacers also add some friction surface to the leaf and help to hold the cakes thereon when they are removed from the bath.

A pipe 15, perforated along its lower side (for example with ¼ inch holes 3 inches apart,) is supported well above the headers 12 of each leaf (and above the top of the slimes bath in the vat and so above the top of the cake on the filter leaf) by means of supports, such as straps 17. These straps may be of suitable material bolted through the headers by means of bolts 18. The straps 17 may bend immediately around the pipe and have a bolt 21 passing through the straps below the pipe. For the purpose of removing the leaves from the vats, holes 20 are provided in the headers 12 in which suitable hooks may be inserted for lifting the leaf. Connected with the pipe 15 is a pressure pump 22. The pump is connected with the pipe 15 through the valve 23, pipe 24, valves 25 and connections 26. By means of the pump and the above connections water may be forced at any desired pressure, as say 60 pounds, through the pipe 15 and directed on top of the headers 12. The header will take the pressure of the water rather than the cake, and the water will merely run down copiously over the leaf and its attached cake without any substantial pressure. The purpose of the pump 22, its connections and the pipe 15 is to deliver a large amount of water on top of the header within a very short time.

The operation of my process and apparatus is as follows: The leaves are submerged in the slimes to be treated, vacuum is created within the leaf by the vacuum pump 3, and this is continued until a cake of proper thickness is deposited on the filter media. As soon as vacuum is turned on and as long as it is maintained the extended portions of the media close and seal. If it is desired, the cake is then treated with barren solution and wash water in the usual way, the vacuum being maintained continuously. When the cake has been suitably treated and washed, the leaf, with its cake, will be removed from the wash water either by lifting the cake into the air or by decanting the water from the vat, while still maintaining the vacuum on the leaf. When the cake is out of the wash water and is suspended in the air, the full vacuum will be maintained for about five to ten minutes. This will entirely empty the leaf of water and will rapidly remove a considerable portion of the contained moisture from the cake and so "dry" the cake. The vacuum pump is then cut off and water is admitted under considerable pressure into the pipe 15 and through the perforations therein onto the top of the header 12, flooding the entire upper portion of the leaf and cake. The cake is dislodged in from one to three minutes and the filter surface is washed clean by the rain from the one-quarter inch holes in the pipe 15. The cake drops into the hopper-shaped bottom of the vats and may be sluiced away.

The cake before the special drying step contains about 30% of moisture. By the described full vacuum action of the pump for about five to ten minutes while the cake is suspended in air, the moisture is reduced to about 20% and may be more or less concentrated toward the inner parts of the cake. The special drying action described seems to tend to crack the cake at the top and to more or less separate it there from the filter medium. And when the vacuum pump is cut off the cake seems to sag at the top and to start to dislodge itself by its own weight from the filter medium there, and a copious flood of water applied then and there as the cake separates from the cloth seems to hasten and insure the dislodgment.

The matter claimed in the present application is divided out of my application, Serial No. 773,375, filed June 13, 1913, Patent No. 1,087,994, issued November 18, 1913, in which the claims are directed to the process.

Having described my invention what I claim as new and desire to secure by Letters Patent, is:—

1. A filter leaf having a header, a frame, filter media mounted on said frame and supported by said header, and a perforated pipe mounted on said leaf above said header.

2. In a filter leaf, the combination of a header, a tubular frame carried by said header, a filter medium surrounding said frame, a porous fibrous filler between the sides of said medium, and a perforated pipe carried by said leaf above said header.

3. In a filter leaf, the combination of a header, a tubular frame carried by said header, a filter medium surrounding said frame, a porous fibrous filler between the sides of said medium, a perforated pipe carried by said leaf above said header, and means whereby said pipe is adapted to supply water under pressure to said header.

4. In combination with a vat for a slimes bath, a smooth surfaced filter leaf having porous filler and adapted to be submerged in said bath and to have a filter cake deposited thereon and to be separated from said bath, means for applying suction interiorly to said filter leaf both when submerged in said bath and when separated from said bath and for cutting off said suction, and means mounted on said leaf for flooding said leaf and its cake exteriorly with water.

5. In a filter leaf, the combination of a header, a tubular frame carried by said header, a filter medium surrounding said frame and open at its bottom side, a porous fibrous filler between the sides of said medium, a perforated pipe above said header, and means for supplying water under pressure to said pipe.

6. In a filter leaf, the combination of a header, a tubular frame carried by said header, a filter medium surrounding said frame and open at its bottom side and adapted to be closed by suction, a porous fibrous filler between the sides of said medium, and a perforated pipe above said header.

7. In combination with a vat for a slimes bath, a smooth-surfaced open-bottomed filter leaf having a porous filler and adapted to be submerged in said bath and to have a filter cake deposited thereon and to be separated from said bath, means for applying suction interiorly to said filter leaf both when submerged in said bath and when separated from said bath and for cutting off said suction, and means for flooding said leaf and its cake exteriorly with water.

8. In a filter leaf the combination of a header, a filter medium carried by the header, a tubular frame inside said filter medium and having an outside suction connection and a plurality of its members perforated whereby suction may be produced inside the leaf through the perforated members simultaneously, and a perforated pipe directly above said header adapted to supply water under pressure to said header.

9. In a filter leaf the combination of a header, a frame, a filter medium surrounding said frame and having a plurality of openings across its bottom side adapted to be closed by suction, a porous filler between the sides of said medium and means for removing filtrate from two sides of said leaf simultaneously.

10. In a filter leaf the combination of a header, a frame, a filter medium surrounding said frame and having a plurality of openings across its bottom side adapted to be closed by suction, a porous filler between the sides of said medium and a perforated pipe above said header adapted to supply water under pressure to said header.

11. In a filter leaf the combination of a header, a filter medium carried by the header and having a plurality of openings across its bottom side adapted to be closed by suction, a tubular frame inside said filter medium and having an outside suction connection and a plurality of its members perforated whereby suction may be produced inside the leaf through the perforated members simultaneously.

12. In a filter leaf the combination of a header, a filter medium carried by the header and having a plurality of openings across its bottom side adapted to be closed by suction, a tubular frame inside said filter medium and having an outside suction connection and its upper and lower members perforated whereby suction may be produced inside the leaf through both members simultaneously.

13. In a filter leaf the combination of a header, a tubular frame, a filter medium surrounding said frame and having a plurality of openings across its bottom side adapted to be closed by suction, a porous filler between the sides of said medium and strips on the outside of the leaf.

14. In a filter leaf, the combination of a header, a tubular frame, a filter medium surrounding said frame and having a plurality of openings across its bottom side adapted to be closed by suction, a porous filler between the sides of said medium, strips on the outside of the leaf, and a perforated pipe above said header adapted to copiously flood said header with water.

15. In a filter leaf, the combination of a header, a tubular frame having its upper and lower members perforated and opening inside the leaf and having an outside suction connection, a filter medium surrounding said frame and extending a distance below the lower frame member, said extension being stitched at intervals and the openings between said stitches being adapted to be closed by suction, a fibrous filler between the sides of said medium, strips on the outside of the medium and bolted therethrough at intervals, and a perforated pipe above said header adapted to copiously flood said header with water.

In testimony whereof, I have signed my name to this specification, in the presence of two subscribing witnesses.

CHARLES BUTTERS.

Witnesses:
NEWTON A. BURGESS,
EDWIN SEGER.